United States Patent [19]

Iikawa et al.

[11] Patent Number: 4,760,240
[45] Date of Patent: Jul. 26, 1988

[54] PROCESS FOR LASER WELDING OF ALUMINUM BASED ELEMENTS

[75] Inventors: Tsutomu Iikawa, Kawasaki; Takeaki Sakai, Yamato; Isao Kawamura, Yokohama; Katsuhide Natori, Yokohama; Takeshi Nagai, Yokohama; Shigeki Okamoto, Kawasaki, all of Japan

[73] Assignee: Fujitsu Limited, Kawasaki, Japan

[21] Appl. No.: 12,156

[22] Filed: Feb. 9, 1987

Related U.S. Application Data

[63] Continuation-in-part of Ser. No. 560,174, Dec. 12, 1983, and Ser. No. 746,669, Jun. 20, 1985.

[30] Foreign Application Priority Data

Feb. 24, 1983 [JP] Japan .................. 58-028617
Aug. 1, 1983 [JP] Japan .................. 58-139492

[51] Int. Cl.$^4$ ............................................ B23K 26/00
[52] U.S. Cl. .................................................. 219/121.64
[58] Field of Search .................. 219/121 LC, 121 LD, 219/121 EC, 121 ED

[56] References Cited

FOREIGN PATENT DOCUMENTS 0117352 9/1984 European Pat. Off. ...... 219/121 LD

Primary Examiner—C. L. Albritton
Attorney, Agent, or Firm—Staas & Halsey

[57] ABSTRACT

A process for laser welding a cover and a casing, each made of aluminum or an aluminum-based alloy, via a nickel layer plated thereon, thereby forming a package for electronic devices, the process comprising the steps of: boring holes in sides of the casing, thereby providing holes through which input/output and source terminals can be inserted and be soldered hermetically to the casing; plating a nickel layer on the surface of the casing; mounting electronic devices in the casing and forming necessary connections between the devices and the terminals; and, welding the cover and the casing together by pulsed YAG laser beam, thereby forming a weld zone containing 1.5 to 10.0% of nickel by weight, and sealing the cover and the casing hermetically.

2 Claims, 4 Drawing Sheets

COVER AND CASING

COVER AND CASING

4,760,240

PROCESS FOR LASER WELDING OF ALUMINUM BASED ELEMENTS

CROSS REFERENCE

This is a continuation-in-part application of copending U.S. applications Ser. Nos. 560,174 filed 12-12-83 and 746,669, filed 6-20-85.

BACKGROUND OF THE INVENTION

1. Field of the Invention

The present invention relates to an assembly of welded aluminum-based elements, particularly a process for making a package of a microwave amplifier.

2. Description of the Related Art

It is well known that thermal deterioration of elements must be avoided when sealing a package for integrated circuit devices (IC's). Although a stainless steel cover and casing have been used for producing such a package, steel is not only heavy but also exhibits a relatively low thermal conductivity.

This low thermal conductivity causes a deterioration in the performance of IC's mounted in the package because of a low heat dissipation property, particularly in the package for high output amplifiers.

On the other hand, aluminum or an aluminum alloy is lighter and exhibits a desirable malleability and excellent thermal conductivity, and therefore, aluminum or an aluminum alloy is more suitable for producing a package of IC's. Nevertheless, where the aluminum or aluminum alloy elements must be bonded together to produce the above-mentioned package, this cannot be achieved by brazing, because this method makes it necessary to subject the package as a whole to a high temperature.

A local heating such as laser welding may be applied when bonding aluminum elements, but aluminum cools rapidly during laser welding because of its high thermal conductivity and the weld zone tends to crack, which leads to a nonairtight sealing of the package. Furthermore, aluminum exhibits high reflection characteristics against a laser beam. Therefore, it is impossible to fuse a thick aluminum layer by using a continuous oscillating yttrium-aluminum garnet (YAG) laser which has a relatively low output in the order of several hundred watts, and a $CO_2$ laser. Such cracking may also occur when welding an aluminum-based alloy, such as a corrosion-resistant aluminum-magnesium alloy.

Steve Bolin et al disclose, on page 26 of an article, Laser Welding, Cutting and Drilling, Part 2, Assembly Engineering, July 1980, that the successful solution was to alter the composition of the weld joint by adding a filler metal-specifically type 4047 aluminum alloy (same as 718 braze alloy). The 12% silicon content of this material prevented the occurrence of centerline cracks by increasing the high temperature strength of the metal.

SUMMARY OF THE INVENTION

It is an object of the present invention to provide a process for welding aluminum or aluminum-based elements without the occurrence of cracks in the weld zone.

It is another object of the present invention to provide a process for an airtight welding of aluminum or aluminum-based elements.

It is yet another object of the present invention to provide a process for welding aluminum or aluminum-based elements by means of a laser beam so that a package for electronic devices is formed.

According to the present invention, there is provided a process for laser welding a cover and a casing, each made of an aluminum or an aluminum-based alloy, via a nickel layer plated thereon, thereby forming a package for electronic devices, the process comprising the steps of: boring holes in the sides of the casing, thereby providing holes through which input and output terminals can be inserted and be soldered hermetically to the casing; plating a nickel layer on the surface of the casing; mounting electronic devices in the casing and forming necessary connections between the devices and the terminals; welding the cover and the casing together by pulsed YAG laser irradiation, thereby forming a weld zone containing 1.5 to 10.0% of nickel by weight, and sealing the cover and the casing hermetically.

DESCRIPTION OF THE PREFERRED EMBODIMENTS

The cover and casing may be formed by casting or by cutting of essentially pure aluminum or a cast aluminum-based alloy, or a corrosion-resistant aluminum-based alloy or other aluminum-based alloy. A pure aluminum may be, e.g., A 1100 as defined in Japanese Industrial Standard (JIS) H 4000. A cast aluminum-based alloy may be, e.g., AC4A alloy, which contains, in percentage by weight, $<0.2$ Cu, 8.0 to 10.0 Si, 0.2 to 0.8 Mg, $<0.2$ Zn, $<0.7$ Fe, 0.3 to 0.8 Mn, $<0.2$ Ti. A corrosion-resistant aluminum-based alloy may be, e.g., A 5052 alloy which contains, in percentage by weight, $<0.45$ (Si+Fe), $<0.10$ Cu, $<0.10$ Mn, 2.2 to 2.8 Mg, 0.15 to 0.35 Cr, $<0.10$ Zn. Both of these alloys are defined also in JIS H 4000.

EXAMPLE 1

Figure 4:
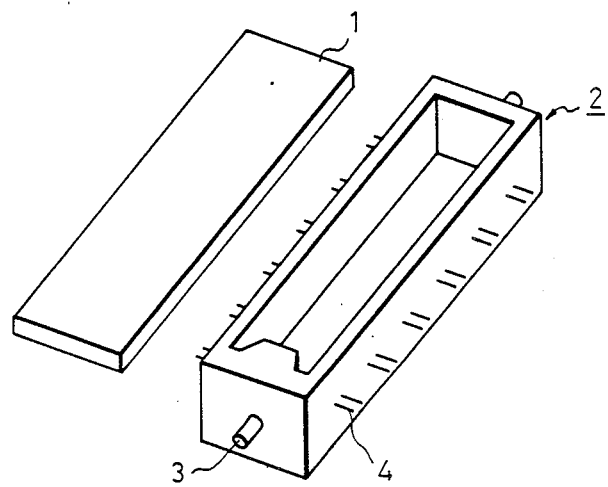
FIG. 4 is a perspective view of a package for electronic devices.
Figure 5:
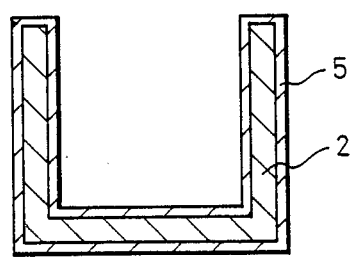
FIG. 5 is a sectional view of the casing shown in FIG. 4.

A cover 1 and a casing 2 having a side thickness of 2.5 mm were produced of A 1100 pure aluminum. Two holes for inserting input/output terminals 3 were bored in the end side surfaces of the casing, and twenty four holes for inserting source terminals 4 were bored in the longitudinal side surface of the casing, as shown in FIG. 4. Then, the casing 2 was chemically plated by means of a plating solution which comprised nickel sulfate 350 g/l, nickel chloride 50 g/l, and boron sulfate 10 g/l, as shown in FIG. 5. Gallium-arsenic FET devices were mounted in the recess of the casing, and the input/output terminals 3 and source terminals 4 were inserted in the side wall of the casing and were soldered to the casing 2 hermetically. The nickel layer 5 exhibited a good underplating for soldering. The necessary connections were accomplished between the electronic devices and the terminals.

The cover 1 and casing 2 were butted together via plated nickel layer 5. The laser welding was carried out in nitrogen with a welding speed of 4 mm/s by a 0.3 mm laser beam with an average output of 200 W, a pulse width of 4 ms, and a pulse rate of 15 p/s.

Figure 1:
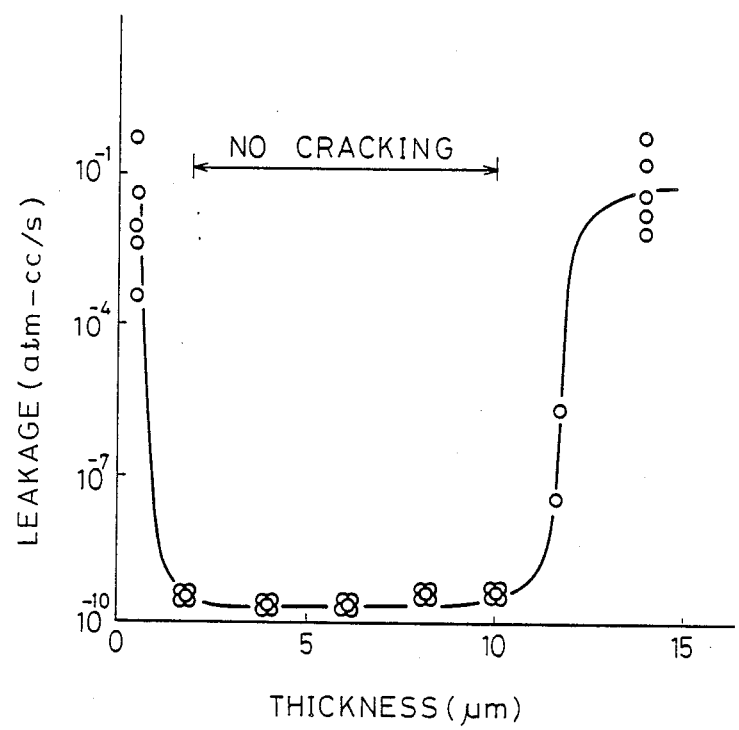
FIG. 1 is a graph showing the relationship between the thickness of plated nickel and leakage.

A series of leakage tests were carried out by means of a helium-leak detector (Veeco Ltd.). High airtightness was obtained when the thickness of the plated nickel on the surface of the casing, was in the range of 2 to 10 μm, as shown in FIG. 1.

EXAMPLE 2

Industrial pure grade aluminum and aluminum-magnesium alloy plates were plated on each side with a nickel layer having a thickness of 1.2, 2.4, 4.0, 5.0, 8.5 or 10.9 μm and these nickel-plated plates were welded by means of a pulsed YAG laser.

Figure 2:
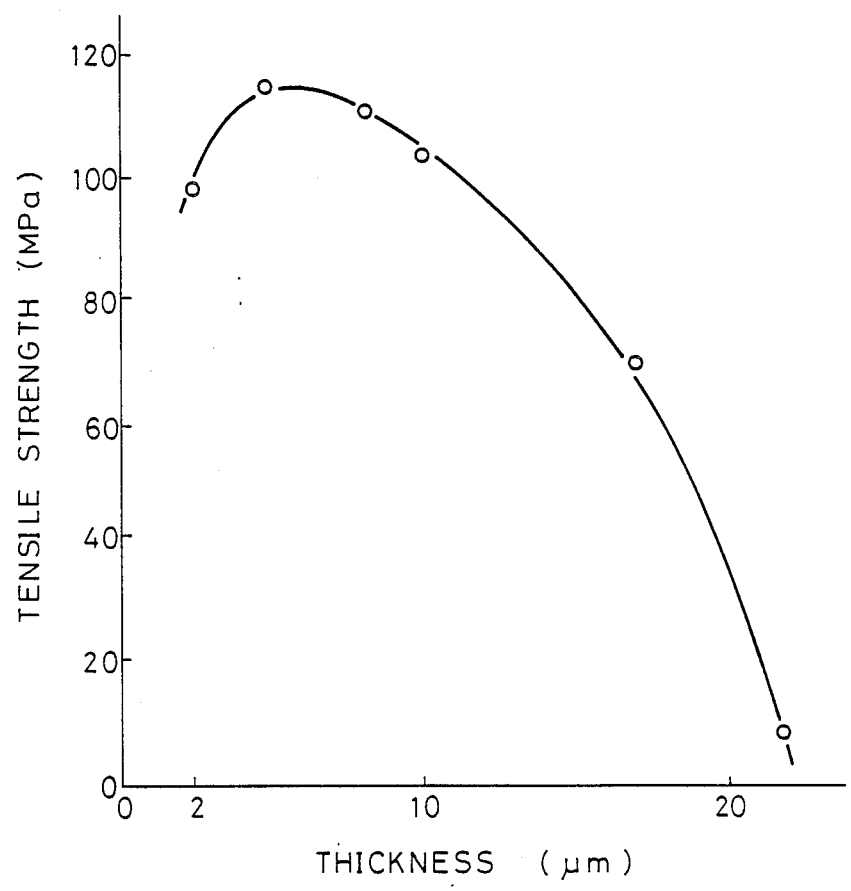
FIG. 2 is a graph showing the relationship between the thickness of plated nickel and the tensile strength.

A series of tests of tensile strength were carried out by means of a tester (Instron Ltd., type 1195), with a drawing speed of 0.5 mm/min. As shown in FIG. 2, when the thickness of the plated nickel was in the range of 2.5 to 10 μm, the weld zone exhibits a high tensile strength.

Figure 3:
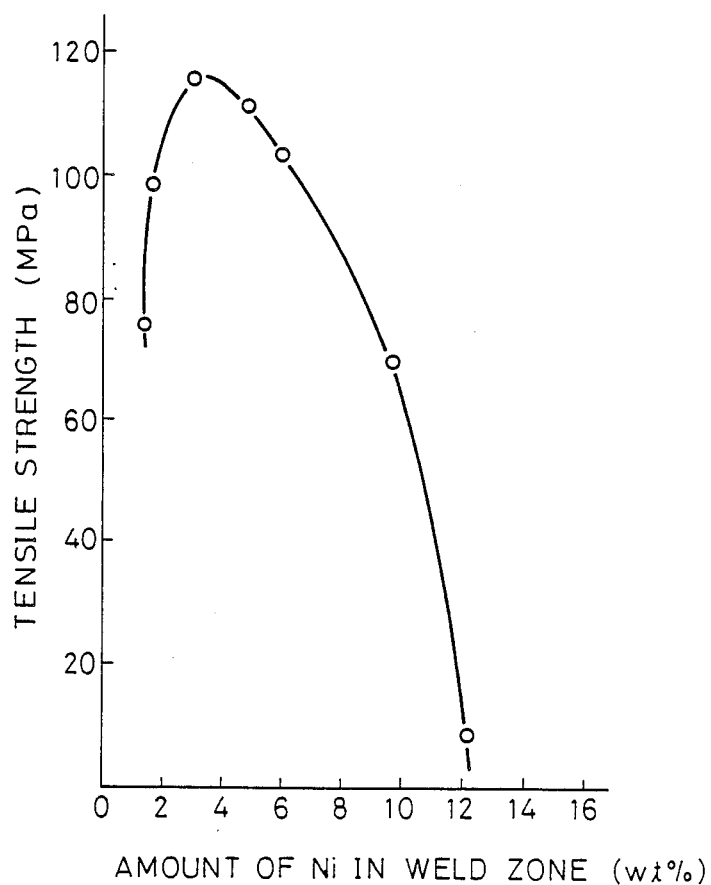
FIG. 3 is a graph showing the relationship between the amount of nickel in the weld zone and the tensile strength.

As explained with reference to FIG. 1, a desirable hermetical sealing was obtained when the thickness of the plated nickel was in the range of 2 to 10 μm, which corresponds nearly to the thickness of 2.5 to 10 μm shown in FIG. 2. While, a desirable tensile strength was obtained when the weld zone contained 1.5 to 10% by weight of nickel as shown in FIG. 3. These packages exhibited a desirable reliability in the test of MIL-STD-202E Reliability Test Method.

We claim:

1. A process for laser welding a cover and a casing with said walls, each made of one of aluminum and aluminum-based alloy, via a nickel layer plated thereon, thereby forming a package for electronic devices, the process comprising the steps of:

boring holes in the side walls of the casing;
   plating a nickel layer on the surface of the casing;
   inserting input/output and source terminals through the holes bored in the side walls of the casing;
   soldering the input/output and source terminals within the holes bored in the side walls of the casing;
   mounting electronic devices in the casing and forming necessary connections between the devices and the terminals; and
   welding the cover and the casing together by a pulsed YAG laser beam, thereby forming a weld zone containing 1.5 to 10.0% of nickel by weight and sealing the cover and the casing hermetically.

2. A process according to claim 1, wherein the thickness of the nickel layer is 2.5 to 10 μm.

* * * * *